(12) United States Patent
Nelson et al.

(10) Patent No.: US 9,115,793 B2
(45) Date of Patent: Aug. 25, 2015

(54) CONTROLLABLE MECHANICAL TRANSMISSION FOR DOWNHOLE APPLICATIONS

(71) Applicant: Schlumberger Technology Corporation, Sugar Land, TX (US)

(72) Inventors: Keith R. Nelson, Sugar Land, TX (US); Todor Sheiretov, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 11 days.

(21) Appl. No.: 14/054,386

(22) Filed: Oct. 15, 2013

(65) Prior Publication Data

US 2015/0105219 A1   Apr. 16, 2015

(51) Int. Cl.
*E21B 4/00* (2006.01)
*F16H 15/50* (2006.01)
*B60W 10/04* (2006.01)
*B60W 10/109* (2012.01)

(52) U.S. Cl.
CPC ............. *F16H 15/503* (2013.01); *B60W 10/04* (2013.01); *B60W 10/109* (2013.01)

(58) Field of Classification Search
None
See application file for complete search history.

(56) References Cited

U.S. PATENT DOCUMENTS

| | | | |
|---|---|---|---|
| 1,139,433 A * | 5/1915 | Monro | 476/1 |
| 1,629,902 A * | 5/1927 | Arter et al. | 475/189 |
| 1,772,593 A * | 8/1930 | Robertson | 476/5 |
| 1,880,217 A * | 10/1932 | Simmons | 175/97 |
| 2,030,203 A * | 2/1936 | Gove et al. | 476/41 |
| 2,108,083 A * | 2/1938 | Sharpe | 475/171 |
| 2,445,066 A * | 7/1948 | Hayes | 476/41 |
| 2,588,408 A * | 3/1952 | O'Leary | 475/74 |
| 2,711,655 A * | 6/1955 | Schottler | 74/424.9 |
| 2,743,084 A * | 4/1956 | Arutunoff | 175/97 |
| 2,822,148 A * | 2/1958 | Murray | 175/15 |
| 2,949,800 A * | 8/1960 | Neuschotz | 81/53.2 |
| 2,959,063 A * | 11/1960 | De Brie Perry | 476/41 |
| 3,033,048 A * | 5/1962 | Perruca | 476/48 |
| 3,048,056 A * | 8/1962 | Wolfram | 74/665 R |
| 3,183,741 A * | 5/1965 | Freeman | 475/186 |
| 3,184,983 A * | 5/1965 | Kraus | 476/41 |
| 3,908,475 A * | 9/1975 | Takagi et al. | 474/12 |
| 5,289,886 A * | 3/1994 | Shikata et al. | 173/181 |
| 5,379,661 A * | 1/1995 | Nakano et al. | 74/99 A |
| 7,112,159 B2 * | 9/2006 | Miller et al. | 476/45 |
| 7,234,543 B2 | 6/2007 | Schaaf | |
| 7,481,281 B2 * | 1/2009 | Schuaf | 175/61 |
| 8,033,328 B2 * | 10/2011 | Hall et al. | 166/65.1 |
| 8,506,452 B2 * | 8/2013 | Pohl et al. | 477/37 |

* cited by examiner

*Primary Examiner* — Dirk Wright
(74) *Attorney, Agent, or Firm* — Trevor Grove (57) ABSTRACT

A transmission for rotatably coupling an input shaft with an output shaft about a longitudinal axis is disclosed, which may include a continuous variable transmission and an output torque sensing control mechanism. The continuous variable transmission may be a toroidal disc continuous variable transmission. The output torque sensing control mechanism may include a spring and an intermediary output shaft rotatably connected with an output rotating member of the continuous variable transmission, and the output shaft may be externally threaded and matable with an internally threaded portion of the intermediary output shaft.

9 Claims, 11 Drawing Sheets

CONTROLLABLE MECHANICAL TRANSMISSION FOR DOWNHOLE APPLICATIONS

FIELD OF THE DISCLOSURE

This disclosure relates generally to downhole applications and, more particularly, the design of transmission systems for use in downhole applications.

BACKGROUND

Downhole technology, such as systems and methods for drilling oil wells and other subterranean holes or shafts, has historically relied on mechanical gearboxes for regulating output shaft speed. These mechanical gearboxes typically have a fixed gear ratio, which results in a fixed operating envelope whereby the drilling system is designed to produce a maximum torque. Typical gearboxes can thus deliver a maximum torque as needed, but this conversely results in slower overall drive shaft angular speed due to elevated gearbox ratios that may be required. With fixed gear ratios, either angular speed or torque may need to be sacrificed. This is particularly problematic in attempting to maintain peak power of an electric driving motor. Ideally, the torque and angular speed would respond such that the peak power and premium performance of the motor is maintained. In a peak power phase, the drive motor is operating at its highest possible efficiency.

Continuous Variable Transmissions (CVT) have been known for a long time and refer to the general class of gearbox transmissions that can automatically and continuously adjust between a minimum and a maximum gear ratio. A variety of CVTs have been developed and utilized in various industries, particularly the automobile industry in order to optimize engine performance and improve fuel economy. CVTs have the benefit of allowing the input shaft to maintain a constant angular velocity over a range of output velocities. Several types of CVTs include: hydrostatic, toroidal, variable-diameter pulley, magnetic, infinitely variable, ratcheting, nautical incremental, cone, radial roller, and planetary transmission systems.

In the context of downhole applications, some conceptualizations of CVT's have been disclosed, however. For instance, U.S. Pat. No. 7,481,281 to Schuaf, the entirety of which is incorporated herein by reference, generally discloses a hollow disc toroidal CVT in FIG. 16 and a ball toroidal CVT in FIG. 17 of Schuaf. These toroidal CVT's may be utilized in connection with a hydraulic, or fluidic, turbine assembly, illustrated in FIG. 21 of Schuaf. In view of Schuaf, a problem remains with downhole applications in that designed CVTs are still too large for some downhole applications, are limited in their ability to accommodate extremely high or sudden rotation resistance differences between the input and output shafts, as may be experienced from material resistance in downhole applications, and are limited to usage with hydraulic drive motors. As such, a more efficient and adaptable transmission system is needed. Moreover, Schuaf does not allow for automatic transmission ratio adjustment as a function of output torque.

BRIEF SUMMARY OF THE DISCLOSURE

The following presents a simplified summary of the disclosure in order to provide a basic understanding of some aspects of the invention. This summary is not an extensive overview of the invention. It is intended to neither identify key or critical elements of the invention nor delineate the scope of the invention. Its sole purpose is to present some concepts of the invention, in accordance with the disclosure, in a simplified form as a prelude to the more detailed description that is presented later.

In one embodiment of the disclosure, a transmission system is provided for rotatably coupling an input shaft with an output shaft about a longitudinal axis. The transmission system may include a continuous variable transmission and an output torque sensing control mechanism.

In another embodiment of the disclosure, a downhole tractor may include a motor, an input shaft rotatably driven by the motor, a transmission system connected to the input shaft, with the transmission system including a continuous variable transmission and an output torque sensing control mechanism, and an output shaft rotatably connected to the transmission system.

In an additional embodiment, a method for downhole conveyance may include providing a downhole tractor, the downhole tractor including a motor, an input shaft rotatably driven by the motor, a transmission system connected to the input shaft, the transmission system including a continuous variable transmission and an output torque sensing control mechanism, an output shaft rotatably connected to the transmission system, and a logging tool connected to the output shaft; inserting the logging tool, the output shaft, and the transmission system into a hole; and operating the motor thereby propelling the downhole tractor.

The following description and the annexed drawings set forth certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description when considered in conjunction with the drawings.

DETAILED DESCRIPTION

The following detailed description and the appended drawings describe and illustrate some embodiments of the invention for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention, such as details of fabrication and assembly. In the accompanying drawings, like numerals represent like components.

In one embodiment of the disclosure, a transmission system for rotatably coupling an input shaft with an output shaft about a longitudinal axis may include a continuous variable transmission and an output torque sensing control mechanism. The transmission system allows for automatic transmission ratio adjustment as a function of output torque. As such, the transmission system enables torque sharing and speed control between multiple prime movers. An example of where use of the transmission system can be used is in downhole tractor applications where multiple continuous variable transmissions may have to work together to provide torque sharing and speed control with multiple prime movers.

The transmission system may have at least a portion of the output shaft externally threaded, and the output torque sensing control mechanism may include a spring and an intermediary output shaft having an internally threaded portion matably receiveable with the externally threaded portion of the output shaft, and the intermediary output shaft may be movable in the longitudinal direction as the intermediary output shaft is threaded with the output shaft. The continuous variable transmission may include an input rotating member rotatably connected to the input shaft, an output rotating member, a toroidal disc provided between the input rotating member and the output rotating member, and a toroidal disc arm connected to the toroidal disc and operable to pivot the toroidal disc between multiple positions between the input rotating member and the output rotating member. A portion of the output shaft may be externally threaded, and the output torque sensing control mechanism may include a spring and an intermediary output shaft rotatably connected to the output rotating member, the intermediary output shaft having an internally threaded portion matably receivable with the externally threaded portion of the output shaft, the intermediary output shaft movable in the longitudinal direction as the intermediary output shaft is threaded with the output shaft. The spring may be positioned proximate to the input shaft, and the output torque sensing control mechanism may further include a first longitudinal member having ends and provided between the spring and the toroidal disc arm, and a second longitudinal member having ends and provided between the toroidal disc arm and the intermediary output shaft, with the ends of the first and second longitudinal members proximate the toroidal disc arm rounded so as to permit the toroidal disc arm to pivot while contacting the first and second longitudinal members. The spring may be provided around at least a portion of the input shaft. The spring moves the continuous variable transmission to a default known position, which is the lowest gear ratio. The transmission system may include a transmission housing substantially enclosing the output torque sensing control mechanism and the continuous variable transmission. The transmission housing may include a window provided proximate to the toroidal disc arm.

In another embodiment of the disclosure, a downhole tractor may include a motor, an input shaft rotatably driven by the motor, a transmission system connected to the input shaft, the transmission system including a continuous variable transmission and an output torque sensing control mechanism, and an output shaft rotatably connected to the transmission system. The motor may be an electrically driven motor. The continuous variable transmission of the transmission system may include an input rotating member rotating member rotatably connected to the input shaft, an output rotating member, a toroidal disc provided between the input rotating member and the output rotating member, and a toroidal disc arm connected to the toroidal disc and operable to pivot the toroidal disc between multiple positions between the input rotating member and the output rotating member. The output torque sensing control mechanism of the transmission system may include a spring and an intermediary output shaft rotatably connected to the output rotating member, the intermediary output shaft having an internally threaded portion matably receivable with the externally threaded portion of the output shaft, the intermediary output shaft movable in the longitudinal direction as the intermediary output shaft is threaded with the output shaft. The output torque sensing control mechanism may further include a first longitudinal member provided between the spring and the toroidal disc arm, and a second longitudinal member provided between the toroidal disc arm and the intermediary output shaft, with the ends of the first and second longitudinal members proximate the toroidal disc arm rounded so as to permit the toroidal disc arm to pivot while contacting the first and second longitudinal members.

In an additional embodiment of the disclosure, a method for downhole conveyance may include providing a downhole tractor including a motor, an input shaft rotatably driven by the motor, a transmission system connected to the input shaft, the transmission system comprising a continuous variable transmission and an output torque sensing control mechanism, an output shaft rotatably connected to the transmission system, and a logging tool connected to the output shaft; inserting the logging tool, the output shaft, and the transmission system into a hole; and operating the motor thereby propelling the downhole tractor. The method for downhole conveyance may also include orienting the transmission system, the output shaft and the logging tool horizontally with respect to the earth in order to perform logging operation in the hole.

With reference to FIGS. 1-6, an input shaft 102 and an output shaft 104 in a downhole application may be rotatably connected to each other by a transmission system 100. A CVT system 110 may be rotatably connected to input shaft 102 at a first or input end, and CVT system 110 may be rotatably connected to an intermediary output shaft 120 at a second or output end opposed to the first end of CVT 110. Intermediary output shaft 120 may thereby be rotatably connected to output shaft 104 in order to transitively connect input shaft 102 with output shaft 104 through transmission system 100. The input shaft 102, output shaft 104, CVT system 110, and intermediary output shaft 120 may be individually rotatable about a central axis 200 extending longitudinally through transmission system 100.

Transmission system 100 may include a transmission housing 106 for covering or protecting the internal components of transmission system 100. In some embodiments, transmission housing 106 is rotationally stable or secure while many of the internal or partially internal components, including input shaft 102, output shaft 104, CVT system 110, and intermediary output shaft 120 are freely rotatable. In order to secure input shaft 102 to housing 106, a housing end 108A may be provided on a first or input end of housing 106. A housing end 108B may also be provided on a second or output end of housing 106 for securing output shaft 102 with transmission system 100. Each housing end 108A, 108B may include any number of bearings 122 in order to permit the free rotation of input shaft 102 and output shaft 104 about central axis 200. In downhole applications, transmission system 100 may have small dimensions. Some downhole applications, such as wireline tractors, may have small dimensions due to the narrowness of the hole and operating space. Embodiments of the transmission system 100 may be manufactured to accommodate small operating dimensions. For instance, one embodiment of transmission system 100 features a housing 106 with a diameter of approximately 1.8 inches. In some embodiments the diameter of the housing 106 can be less than 3 inches in order to accommodate small downhole applications. Additionally, the longitudinal length of transmission system 100, measured from housing end 108A to housing end 108B, may be approximately 6 inches in one embodiment. In some embodiments, the length of transmission system 100 may be between 4 and 10 inches.

CVT system 110 may be a toroidal disc CVT system, as shown for instance in the illustrated embodiment, however other known or to be developed CVT systems for rotatably connecting input shaft 102 with intermediary output shaft 104 are contemplated within the disclosure. Illustrative CVT systems can include those that use balls, discs, and the like. Toroidal CVT system 110 may include a first or input rotating member 112, a second or output rotating member 114, and any number of toroidal discs 116 provided between first and second rotating members 112, 114. The toroidal discs 116 may be held between first and second rotating members 112, 114 by a disc arm 118. In the illustrated embodiment, two toroidal discs 116 are provided. It should be appreciated by those of ordinary skill in the art that CVT system 110 may operate to provide an infinite number of gear ratios between first and second rotating members 112, 114 depending on the position of the toroidal discs 116. By virtue of their direct or transitive connection with members 112, 114, there may be an infinite number of gear ratios between input shaft 102 and output shaft 104. The rolling or moving between gear positions of toroidal discs 116 may be accomplished in part by the swinging of disc arm 118. Each disc arm may be pivotally secured to a portion of system 110. In order to accommodate the swinging of disc arm 118, a space or window 124 may be provided in housing 106 so that disc arm 118 will not contact or be interfered with by housing 106 as disc arm 118 swings between gears ratios.

Fasteners 130 may be provided for securing input shaft 102 with first rotating member 112. The fasteners 130 may also be provided for securing intermediary output shaft 120 with second rotating member 114. Fasteners 130 may be bolts, screws or any other known or to be developed fastening devices.

In addition to CVT system 110, an output torque sensing control mechanism 150 may be integrated into transmission system 100. Output torque sensing control mechanism 150 may include a spring or other biasing member 152, arms or longitudinal members 154, and an intermediary output shaft housing 156. Intermediary output shaft housing 156 may be provided to secure intermediary output shaft 120 as well as to engage with the longitudinal members 154. Intermediary output shaft housing 156 may include a first portion 156A and a second portion 156B, each clampable together and including an aligned aperture for receiving a portion of intermediary output shaft 120 as well as output shaft 104. Bearings 122 may be provided between intermediary output shaft housing portions 156A, 156B and intermediary output shaft 120 in order to permit free rotation of intermediary output shaft 120. Intermediary output shaft 120 may also include wings 162 which extend away radially away from the intermediary output shaft 120, and at least a distal portion of wings 162 may be clamped by a pair of bearings 122 provided within intermediary output shaft housing 156.

Intermediary output shaft 120 may be coupled to rotating member 114 at a first end, and connected with output shaft 104 at a second end. Intermediary output shaft 120 may include a bore 158 for receiving an end of output shaft 104. Bore 158 may be internally threaded while the end of output shaft 104 may be externally threaded and matable with the internal threading of bore 158. Additionally, intermediary output shaft housing 156 and intermediary output shaft 120 may be operable to move or translate longitudinally along axis 200 as intermediary output shaft 120 is threaded onto output shaft 104. This threading operation enables output torque sensing control mechanism 150 to function as described herein, in accordance with the disclosure. Furthermore, spring 152, which may be coiled or wrapped about a portion of input shaft 102, may operate to provide a longitudinal translation force against intermediary output shaft housing 156 through arms 154.

In some embodiments, arms 154 are composed of a first arm 154A and a second arm 154B. First arm 154A may be provided between spring 152 and pivotable disc arm 118, and second arm 154B may be provided between the opposed side of pivotable disc arm 118 and intermediary output shaft housing 156, and connected to first intermediary output shaft housing portion 156A. The ends of first and second arms 154A, 154B, which contact pivotable disc arm 118 may be rounded so as to as to permit disc arm 118 to pivot or swing between gear ratios. First and second arms 154A, 154B may be provided between each disc arm 118 included in any particular embodiment. In some embodiments, an intermediary disc 158 may be provided between spring 152 and arm 154. The pivotable disc arm may have a unique shape to mitigate or create a linear relationship to the gear ratio; for example, the pivotable disc arm 118 can have a shape to allow the disc arm 118 to maintain contact with the arm 154.

A longitudinal rod 160 may be insertable through first and second rotating members 112, 114 along longitudinal axis 200. Bearings 122 may be provided on either end of rod 160 in order to permit the rod to freely rotate with respect to the CVT transmission 110. An output end 162 of rod 160 may be matable with intermediary output shaft 120 in order to permit mutual rotation of rod 160 and intermediary output shaft 120 when they are mated. The rod 160 can ensure that the first and second rotating members 112, 114 are in full compression, binding the toroidal disc 116.

Figure 1:
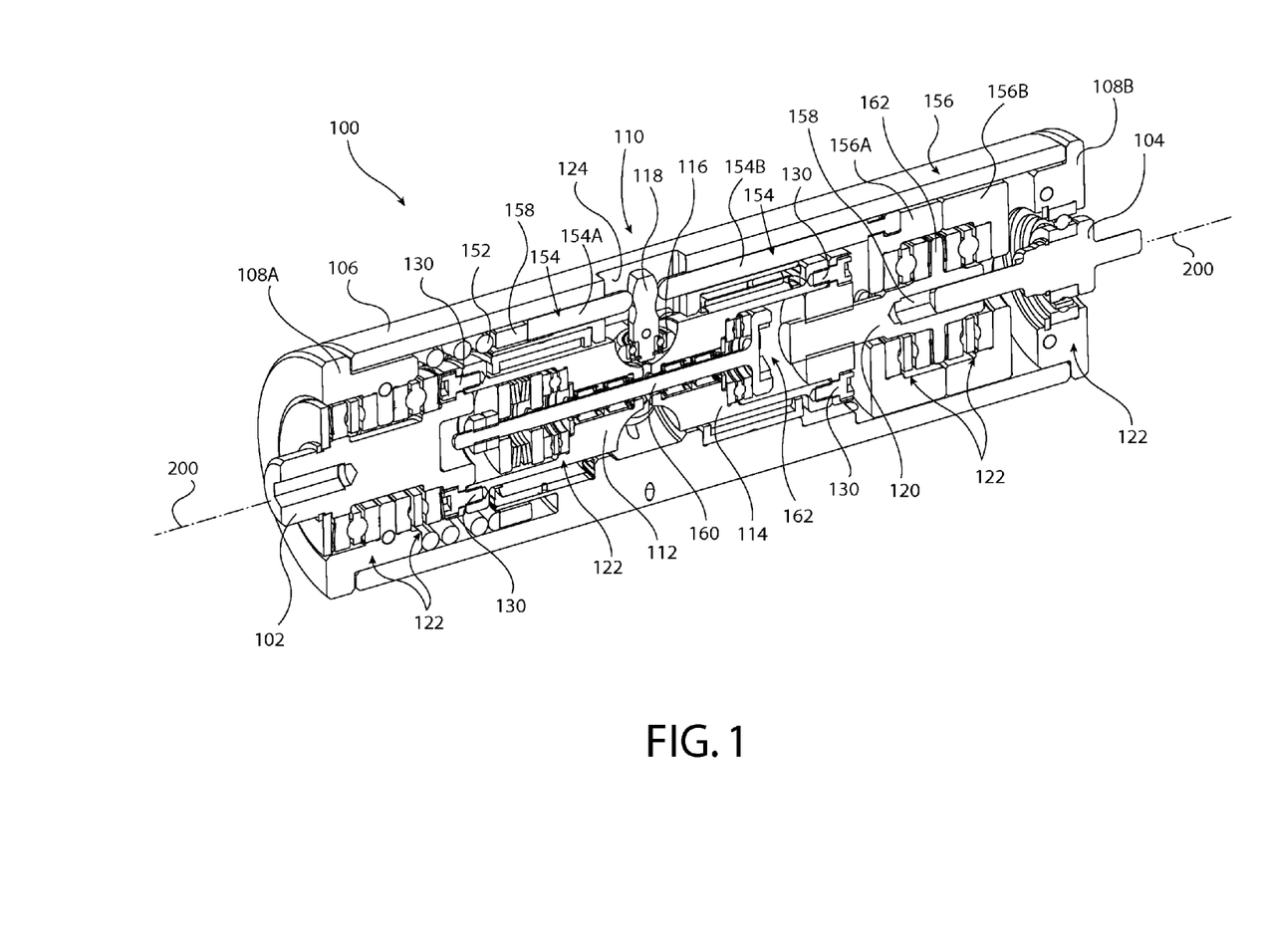
FIG. 1 illustrates a front perspective sectioned view of an embodiment of a transmission system in accordance with the disclosure, with the section taken along the longitudinal axis.
Figure 2:
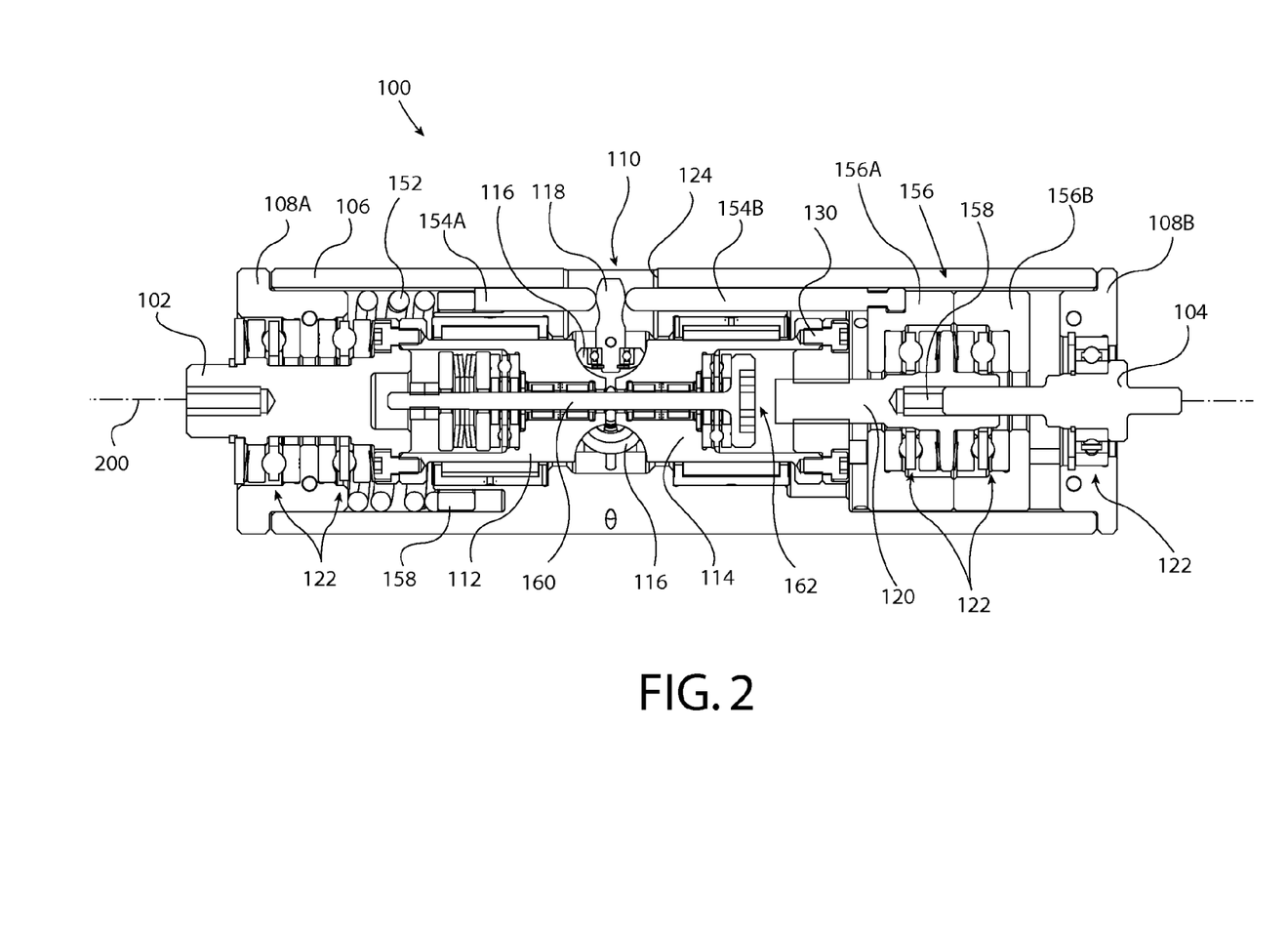
FIG. 2 illustrates a side sectioned view of the transmission system of FIG. 1, with the section taken along the longitudinal axis.
Figure 3:
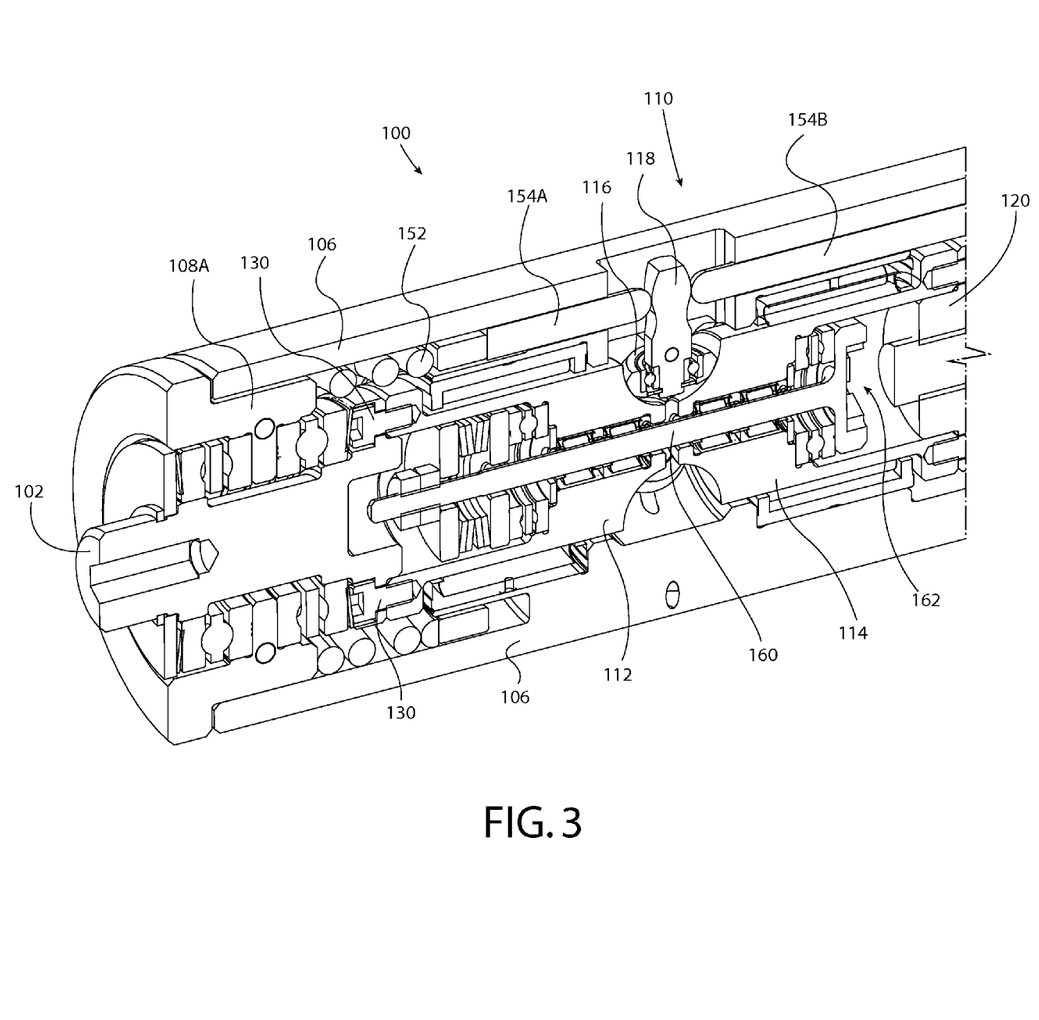
FIG. 3 illustrates an enlarged front perspective sectioned view of the transmission system of FIG. 1, with the section taken along the longitudinal axis.
Figure 4:
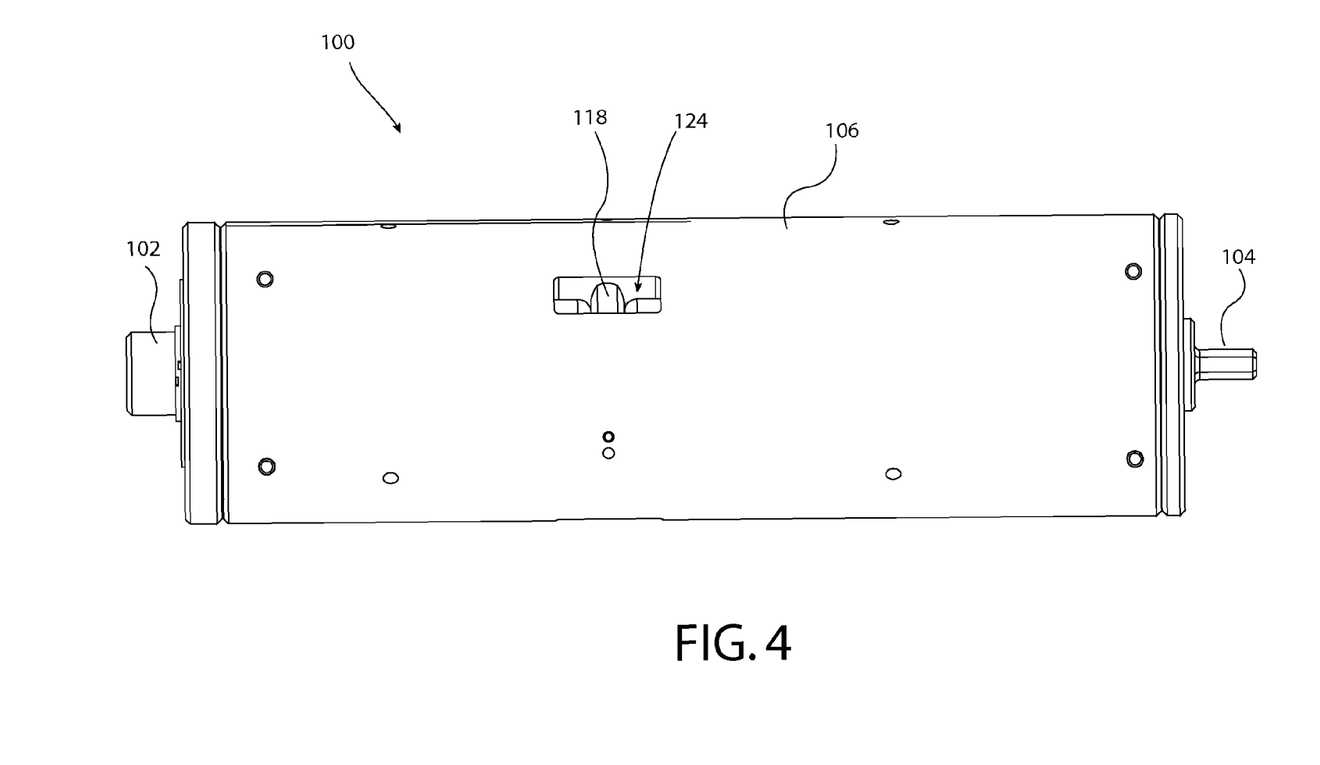
FIG. 4 illustrates a rear sectioned view of the transmission system of FIG. 1, with the section taken along the longitudinal axis.
Figure 5:
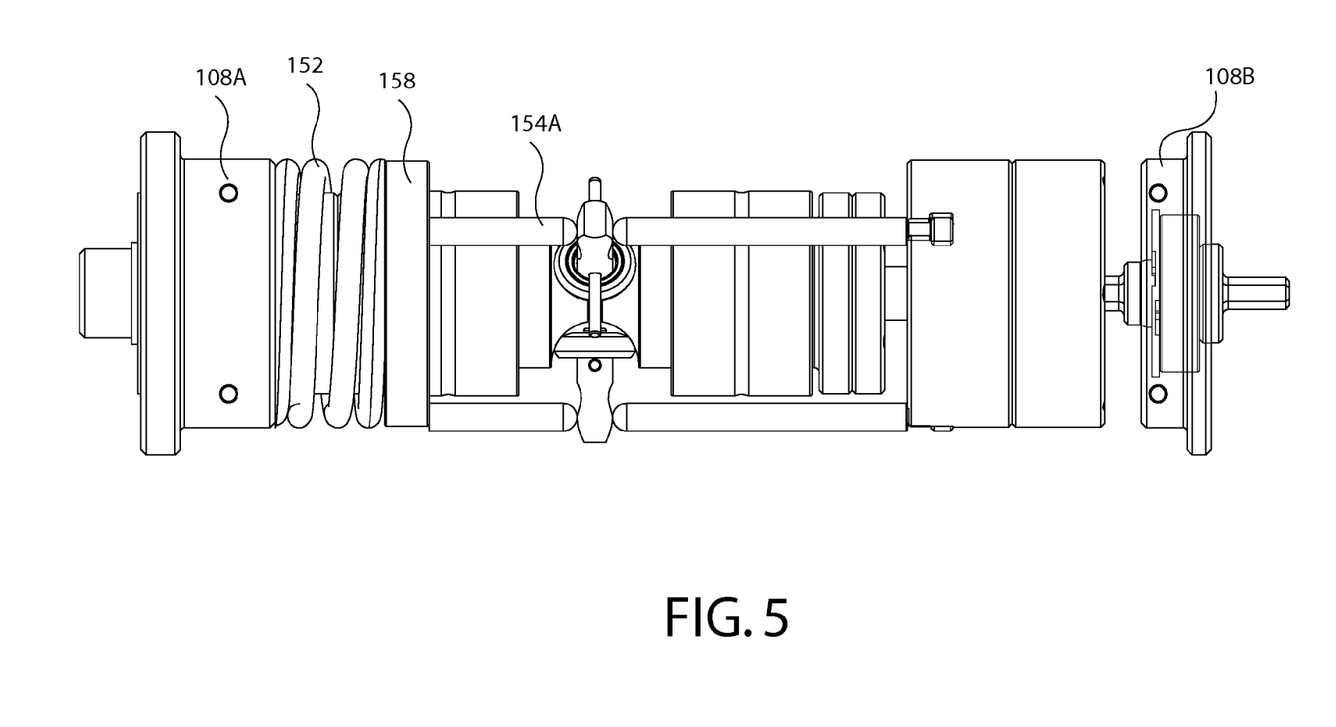
FIG. 5 illustrates a rear sectioned view of the transmission system of FIG. 1, with the transmission housing removed and with the section taken along the longitudinal axis.
Figure 6:
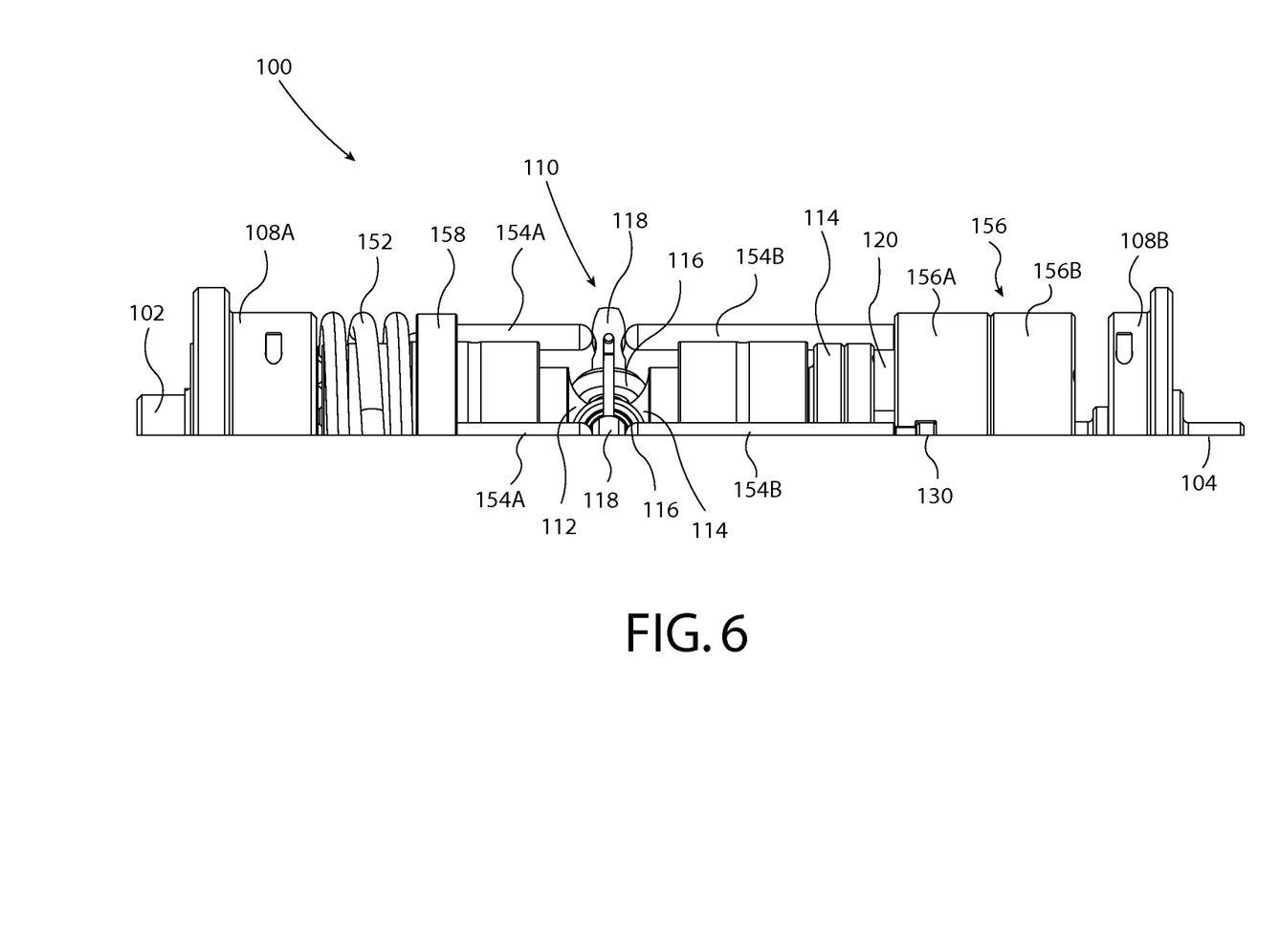
FIG. 6 illustrates a top sectioned view of the transmission system of FIG. 1, with the transmission housing removed and with the section taken along the longitudinal axis.
Figure 7:
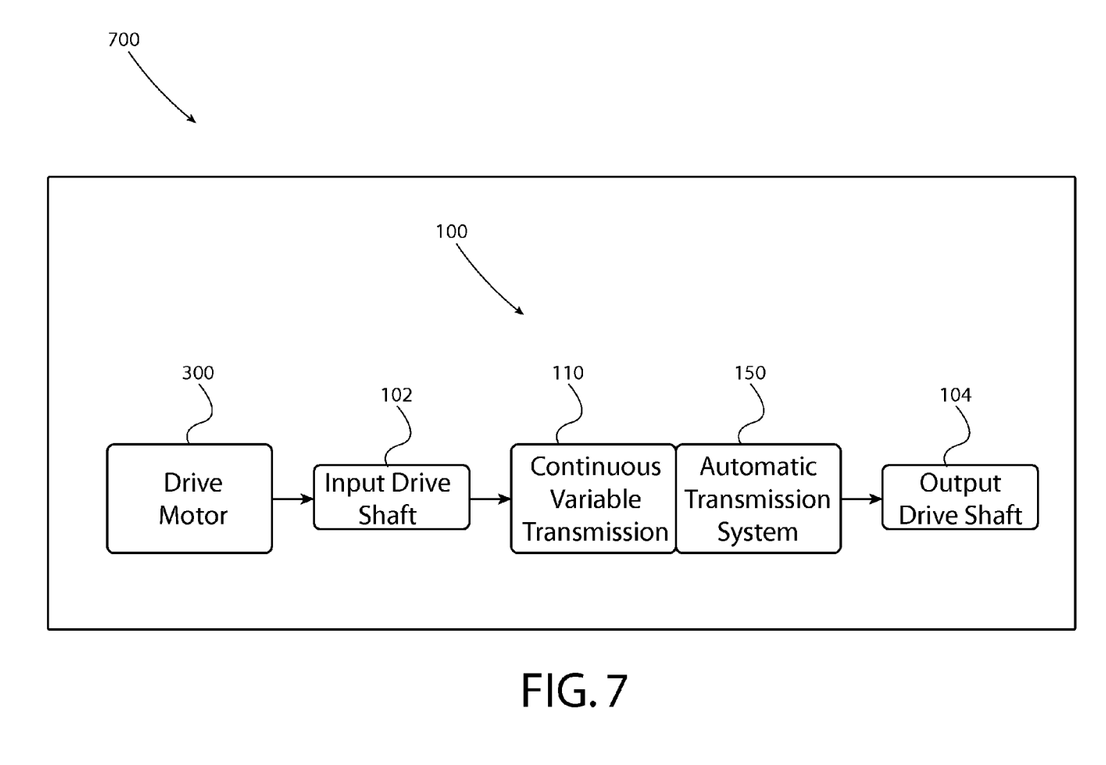
FIG. 7 illustrates a schematic of a downhole tractor having the transmission system of FIG. 1.

FIG. 7 illustrates a schematic of a downhole tractor having the transmission system of FIG. 1. In the illustrated embodiment, a downhole tractor 700 includes a drive motor 300, input drive shaft 102, transmission system 100, and an output shaft 104 for driving wheels, grippers, or tracks (not shown) of the downhole tractor.

The drive motor 300 may be connected to input drive shaft 102. The drive motor 300 can be a direct current motor or an alternating current motor. The drive motor 300 can be a three-phase motor.

The input drive shaft 102 is connected to transmission system 100, comprising CVT 110 and output torque sensing control mechanism 150, which is connected to output shaft 104. Transmission system 100 may thus operate using the output torque sensing control mechanism 150 as a mechanism that determines how much torque is desired and mechanically adjusts the CVT 110 to provide the optimum results of the gear ratio. The CVT 110 may then operate as the mechanism that enables the gear ratio between the input shaft 102 and the output shaft 104 to be altered, for instance between 0.5:1 and 2.0:1 in accordance with one embodiment.

Figure 8A:
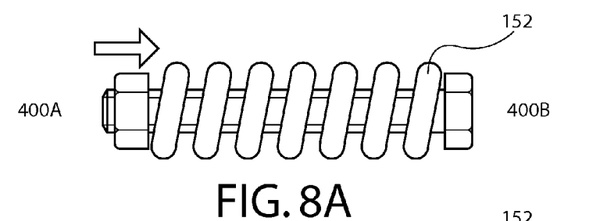
FIGS. 8A-8E illustrate a conceptualization of the functioning of output torque sensing control mechanism as may be included in embodiments of a transmission system in accordance with the disclosure.
Figure 8B:
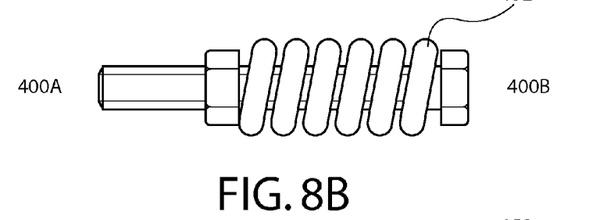
Figure 8C:
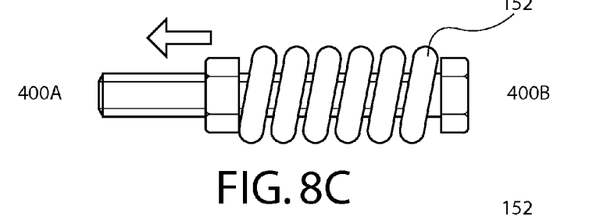
Figure 8D:
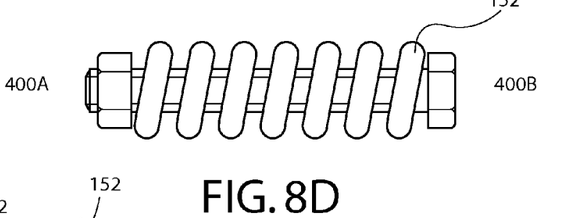

FIGS. 8A-8E illustrate the functional concept of output torque sensing control mechanism 150 in accordance with one embodiment. FIGS. 8A-8D are sequentially ordered to illustrate the longitudinal translation, which occurs as rolling resistances are changed between a first end 400A of a shaft and a second end 400B of a shaft. In FIG. 8A, second end 400B experiences an increase in rolling resistance from a previous equilibrium state. In order to equalize the rolling resistances, translation of the nut occurs due to its threadable engagement with the shaft. At FIG. 8B, the nut stops once the rolling resistances 400A, 400B have reached an equilibrium. In FIG. 8C, the rolling resistance of 400B has decreased and, by operation of spring 152, the nut is translated back to equilibrium in FIG. 8D.

Figure 8E:
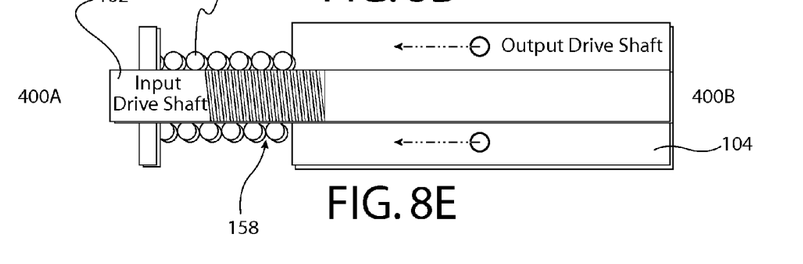

In the embodiment illustrated in FIG. 8E, input drive shaft is threaded on the end and screwed into an adjoining tubular output drive shaft, however it should be appreciated that in other embodiments, such as the embodiment illustrated in FIGS. 1-6, the output shaft 104 may threaded on the end and screwed into an adjoining tubular shaft 158. In either embodiment, the threading causes the threaded tubular shaft 158 to move with linear motion towards the threaded shaft 104. This linear motion can be mechanically linked to the CVT 110, for instance by contact between arms 154A, 154B and disc shafts 118. This matable threading of the shafts of output torque sensing control mechanism 150 can be variably designed to establish a relationship between the motor peak power setting and the output torque. For instance, a fine thread pitch may be utilized to offer greater mechanical leverage, while a coarser thread may be utilized to offer greater linear motion (which in embodiment where arms 154A, 154B are linked with disc shaft 118, may in turn offer greater maximum gear ratios for CVT 110 by increasing the maximum pitch angle of disc shaft 118). The shifting spring 152 may operate to move the tubular shaft back to a known position when no torque is applied by the output shaft. The known position would return the mechanically connected CVT 110 to a position where the gear ratio is less than 1; for example, the gear ratio can be about 0.5. This would happen, for instance, if the motor was turned off or experiencing minimal loading.

One downhole application of transmission system 100 may be implemented with a wireline tractor. A motor spins a drive shaft that is connected to a series of gearboxes, which mechanically drive a wheel that is in contact with a downhole casing or borehole. Based on the amount of tractor force to be applied to convey or push payload services in horizontal environments, the desired torque may be outputted. Where gear ratios are fixed, and not variable, the tractors may be limited on downhole tractor speed by the amount of maximum expected applied torque or tractor force. By its inclusion in transmission system 100, CVT 110 allows the motor 300 under light torque loading to increase the overall drive shaft RPM, which thereby increases the forward tractor linear speed. Moreover, the CVT 110 can be designed to ensure that as the torque loading increases the gear ratio is increased to reduce tractor speed and maintain the drive motor operating in the peak power position for highest efficiency. The highest efficiency position is factor to be considered as the demands on surface power supplies, limitations on electrical transmission through collectors and cables, and motor equipment safety may be considered.

Other downhole applications, may involve a bit cutting downhole into an obstruction, casing, or borehole wall. As the bit drills in, fluctuations in the drill torque are experienced by the drive motor assembly. In worst case situations, the drill bit can stall the motor by biting too hard or binding with the obstruction casing or borehole. By utilizing a variable gear ratio mechanism, the gear ratio would change such that the torque demands of the motor would be within the capability of the drive motor. The mechanism would continue to increase the gear ratio, which slows the drill bit, but increases the amount of torque applied to the drilling area.

Figure 9A:
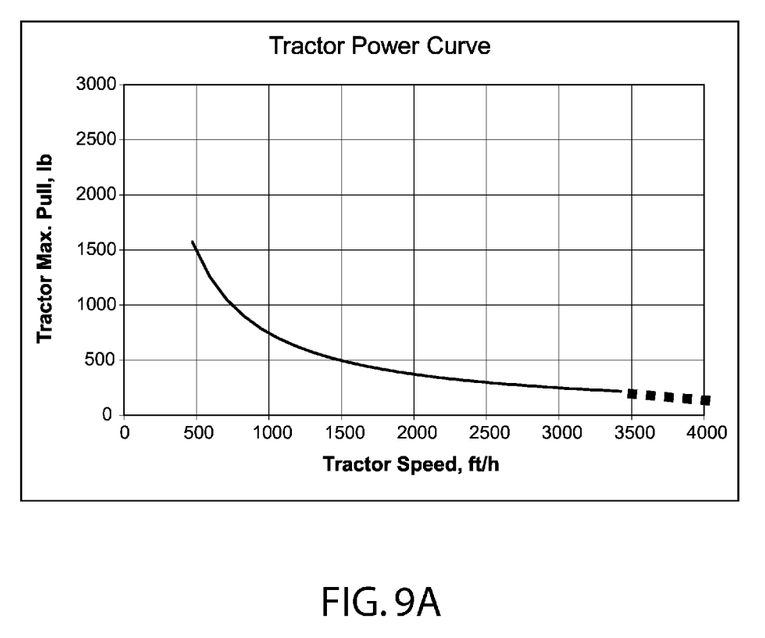
FIG. 9A illustrates a tractor power curve diagram with increased power from an embodiment of a transmission system in accordance with the disclosure.
Figure 9B:
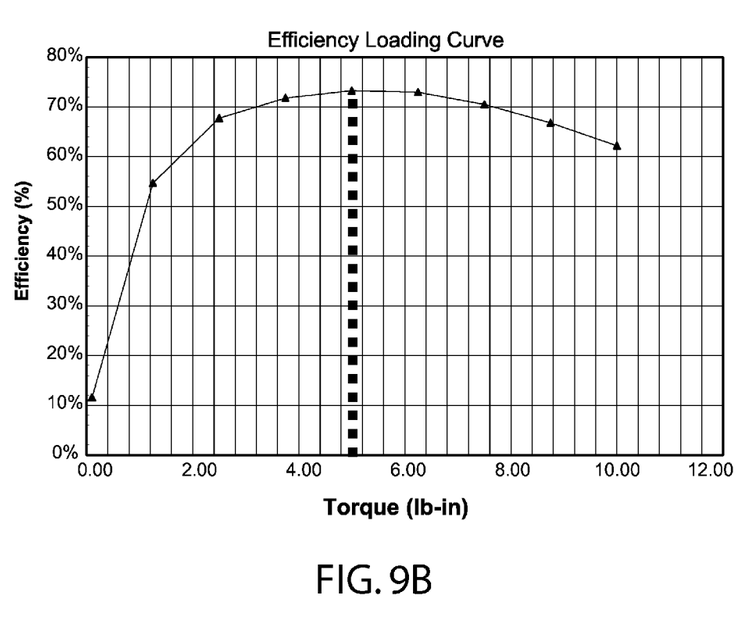
FIG. 9B illustrates an efficiency loading curve diagram identifying maximum efficiency obtained by using an embodiment of a transmission system in accordance with the disclosure.

Referring now to FIGS. 9A and 9B, graphic illustrations are provided to show attainable improved performance utilizing the disclosed transmission system in downhole applications. In FIG. 9A, a tractor power curve downhole illustrates the relationship between tractor force (or load) and speed. As a drive motor speed increases, the tractor load capability decreases. The tractor power curve represents the fixed operating environment for known embodiments where it was previously impossible to go faster than 3500 fph or slower than 500 fph. By utilizing transmission system 100, the speed may be further increased as shown by the extrapolated line, while maintaining the same or nearly the same motor power level. As the load is reduced to a minimal amount, the gear ratio decreases more and more to allow the output shaft to spin fast while the motor rotations per minute stay at its maximum physical capability. Conversely, as the output shaft becomes more loaded, the gear ratio is increased which thereby slows the shaft, but increases the loading capacity. Essentially, the power curve becomes dynamic, which allows it to expand into operating envelopes that have been otherwise inaccessible due to downhole hardware limitations of fixed gear ratio systems.

Another advantage is that the transmission system 100 can be utilized to drive the loading to stay within a drive motor's peak power position. That is, the gear ratio can change in order to maintain maximum efficiency of a downhole motor for peak performance. The efficiency loading curve of FIG. 9B illustrates a peak efficiency, for one embodiment of a downhole application, at approximately 5-lb-in. If the motor outputs any more or less loading, the loss of operating efficiency results in wasted energy. By utilizing the transmission system 100, the variable gear ratio can be used to reduce or increase the motor torque to be the highest efficiency. An example of this in practice would be a downhole tractor conveying a tool in an openhole well. The load on the downhole tractor will change when washouts, obstructions, or other abnormalities are encountered, by utilizing transmission system 100, the gear ratio can continuously change to increase or decrease the amount of torque in order to maintain peak power efficiency through the various naturally occurring torque fluctuations of downhole conveyance.

Figure 10:
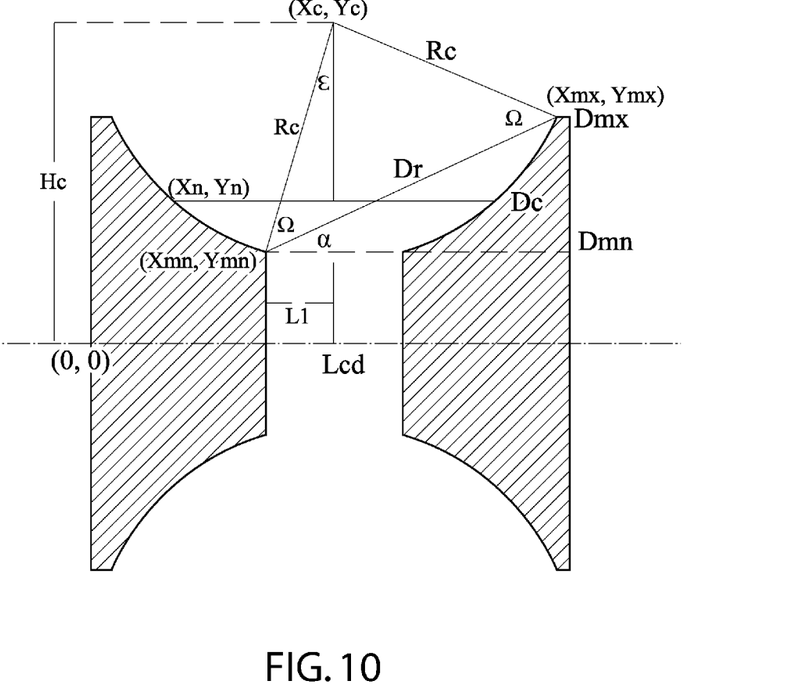
FIG. 10 illustrates a conceptualization of the functioning of a continuous variable transmission system as may be included in embodiments of a transmission system in accordance with the disclosure.

FIG. 10 illustrates a conceptualization of a toroidal disc CVT, which may be CVT 110 in embodiments of the disclosure. The toroidal disc illustrated on the left side is the input shaft while the toroidal disc on the right side is the output shaft. These discs are connected by a roller disc, labeled as $D_R$. As the $D_R$ disc spins about point $(X_C, Y_C)$ it simultaneously contacts both toroidal discs. As illustrated, the $D_R$ disc touches the input shaft at point $(X_{MN}, Y_{MN})$ and the output shaft at point $(X_{MX}, Y_{MX})$. A change in angular velocity and torque generated by roller disc $D_R$ touching the toroidal discs at these two distinct points. The gear ratio is created by the diameter $D_{MX}$ divided by $D_{MN}$. By pivoting roller disc $D_R$ about point $(X_C, Y_C)$, the diameters $D_{MX}$ and $D_{MN}$ change, which results in a variable gear ratio. The output torque sensing control mechanism 150 may be mechanically linked to the roller disc $D_R$ and creates the pivot motion. As illustrated in FIGS. 1-6, this mechanical linkage may occur at arms 154A, 154B. By configuring the ends of arms 154A, 154B to be rounded, the disc $D_R$ is may freely pivot as arms 154 are longitudinally displaced. As output torque sensing control mechanism 150 demands more or less torque, a corresponding pivoting motion of the $D_R$ about $(X_C, Y_C)$ is created.

The descriptions set forth above are meant to be illustrative and not limiting. Various modifications of the invention, in addition to those described herein, will be apparent to those skilled in the art from the foregoing description. Such modifications are also intended to fall within the scope of the concepts described herein. The disclosures of each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the embodiments disclosed in the specification be considered as illustrative, with a true scope and spirit of the invention being indicated by the following claims.

What is claimed:

1. A transmission system for rotatably coupling an input shaft with an output shaft about a longitudinal axis, the transmission comprising:
   a continuous variable transmission comprising: an input rotating member rotatably connected to the input shaft; an output rotating member; a toroidal disc provided between the input rotating member and the output rotating member; and a toroidal disc arm connected to the toroidal disc and operable to pivot the toroidal disc between multiple positions between the input rotating member and the output rotating member; and
   an output torque sensing control mechanism comprising: a spring positioned proximate to the input shaft; and an intermediary output shaft rotatably connected to the output rotating member, the intermediary output shaft having an internally threaded portion matably receivable with an externally threaded portion of the output shaft, the intermediary output shaft movable in the longitudinal direction as the intermediary output shaft is threaded with the output shaft a first longitudinal member having ends and provided between the spring and the toroidal disc arm; and a second longitudinal member having ends and provided between the toroidal disc arm and the intermediary output shaft.

2. The transmission system of claim 1, wherein at least a portion of the output shaft is externally threaded, and the output torque sensing control mechanism comprises:
   a spring; and
   an intermediary output shaft having an internally threaded portion matably receivable with the externally threaded portion of the output shaft, the intermediary output shaft movable in the longitudinal direction as the intermediary output shaft is threaded with the output shaft.

3. The transmission system of claim 1, wherein the spring is provided around at least a portion of the input shaft.

4. The transmission system of claim 1, further comprising a transmission housing substantially enclosing the output torque sensing control mechanism and the continuous variable transmission.

5. The transmission system of claim 4, wherein the transmission housing includes a window provided proximate to the toroidal disc arm.

6. A downhole tractor comprising:
   a motor;
   an input shaft rotatably driven by the motor;
   a transmission system connected to the input shaft, the transmission system comprising:
      a continuous variable transmission, wherein the continuous variable transmission comprises: an input rotating member rotatably connected to the input shaft an output rotating member; a toroidal disc provided between the input rotating member and the output rotating member; and a toroidal disc arm connected to the toroidal disc and operable to pivot the toroidal disc between multiple positions between the input rotating member and the output rotating member; and
      an output torque sensing control mechanism, wherein the output torque sensing control mechanism comprises: a spring; and an intermediary output shaft rotatably connected to the output rotating member, the intermediary output shaft having an internally threaded portion matably receivable with an externally threaded portion of the output shaft, the intermediary output shaft movable in the longitudinal direction as the intermediary output shaft is threaded with the output shaft, a first longitudinal member provided between the spring and the toroidal disc arm; and a second longitudinal member provided between the toroidal disc arm and the intermediary output shaft, wherein the ends of the first and second longitudinal members proximate the toroidal disc arm are rounded so as to permit the toroidal disc arm to pivot while contacting the first and second longitudinal members; and
   an output shaft rotatably connected to the transmission system.

7. The downhole tractor of claim 6, wherein the motor is an electrically driven motor.

8. A method for downhole conveyance comprising:
   providing a downhole tractor comprising:
      a motor,
      an input shaft rotatably driven by the motor,
      a transmission system connected to the input shaft, the transmission system comprising:
         a continuous variable transmission comprising: an input rotating member rotatably connected to the input shaft; an output rotating member; a toroidal disc provided between the input rotating member and the output rotating member; and a toroidal disc arm connected to the toroidal disc and operable to pivot the toroidal disc between multiple positions between the input rotating member and the output rotating member, and an output torque sensing control mechanism comprising: a spring positioned proximate to the input shaft and an intermediary output shaft rotatably connected to the output rotating member, the intermediary output shaft having an internally threaded portion matably receivable with an externally threaded portion of an output shaft connected with the transmission system, the intermediary output shaft movable in the longitudinal direction as the intermediary output shaft is threaded with the output shaft a first longitudinal member having ends and provided between the spring and the toroidal disc arm; and a second longitudinal member having ends and provided between the toroidal disc arm and the intermediary output shaft; and a downhole tractor connected to the output shaft;

inserting the downhole tractor, the output shaft, and the transmission system into a hole; and operating the motor thereby propelling the downhole tractor.

9. The method of claim 8, further comprising orienting the transmission system, the output shaft and the downhole tractor horizontally with respect to earth in order to perform logging operations with a logging tool operatively connected with the downhole tractor.

* * * * *